(12) United States Patent
Huang et al.

(10) Patent No.: US 11,568,138 B2
(45) Date of Patent: Jan. 31, 2023

(54) SYSTEM FOR ENTITY AND EVIDENCE-GUIDED RELATION PREDICTION AND METHOD OF USING THE SAME

(71) Applicants: Beijing Wodong Tianjun Information Technology Co., Ltd., Beijing (CN); JD.com American Technologies Corporation, Mountain View, CA (US)

(72) Inventors: Kevin Huang, Sunnyvale, CA (US); Jing Huang, Mountain View, CA (US); Guangtao Wang, Cupertino, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 163 days.

(21) Appl. No.: 17/002,506

(22) Filed: Aug. 25, 2020

(65) Prior Publication Data
US 2022/0067278 A1    Mar. 3, 2022

(51) Int. Cl.
G06F 40/30        (2020.01)
G06F 40/258       (2020.01)
G06F 40/253       (2020.01)
G06F 40/289       (2020.01)

(52) U.S. Cl.
CPC ......... *G06F 40/258* (2020.01); *G06F 40/253* (2020.01); *G06F 40/289* (2020.01); *G06F 40/30* (2020.01)

(58) Field of Classification Search
CPC .................................................. G06N 3/0481
See application file for complete search history.

(56) References Cited

PUBLICATIONS

Hengzhu Tang, Yanan Cao, Zhenyu Zhang, Jiangxia Cao, Fang Fang, Shi Wang, Pengfei Yin, "HIN: Hierarchical Inference Network for Document-Level Relation Extraction", Mar. 28, 2020, arXiv (Year: 2020).*

(Continued)

*Primary Examiner* — Jialong He
(74) *Attorney, Agent, or Firm* — Scully, Scott, Murphy & Presser, P.C.

(57) ABSTRACT

System and method multitask prediction. The system include a computing device. The computing device has a processer and a storage device storing computer executable code. The computer executable code is configured to: provide a head entity and a document containing the head entity; process the head entity and the document by a language model to obtain head extraction corresponding to the head entity, tail extractions corresponding to tail entities in the document, and sentence extraction corresponding to sentences in the document; predict a head-tail relation between the head extraction and the tail extractions using a first bilinear layer; combine the sentence extraction and a relation vector corresponding to the predicted head-tail relation using a second bilinear layer to obtain a sentence-relation combination; and predict an evidence sentence supporting the head-tail relation using a third bilinear layer based on the sentence-relation combination and attention extracted from the language model.

17 Claims, 9 Drawing Sheets

(56) References Cited

PUBLICATIONS

Han, Xiaoyu, and Lei Wang. "A novel document-level relation extraction method based on BERT and entity information." IEEE Access 8 (May 2020): 96912-96919. (Year: 2020).*
Sahu, Sunil Kumar, et al. "Inter-sentence relation extraction with document-level graph convolutional neural network." arXiv preprint arXiv:1906.04684 (2019). (Year: 2019).*
Christoph Alt, Marc Hubner, and Leonhard Hennig, Improving relation extraction by pre-trained language representations, 2019, arXiv:1906 03088.
Livio Baldini Soares, Nicholas FitzGerald, Jeffrey Ling, and Tom Kwiatkowski, Matching the blanks: Distributional similarity for relation learning, Proceedings of the 57th Annual Meeting of the Association for Computational Linguistics, 2019, 2895-2905.
Razvan Bunescu and Raymond Mooney, A shortest path dependency kernel for relation extraction, Proceedings of Human Language Technology Conference and Conference on Empirical Methods in Natural Language Processing, . 2005, 724-731.
Rui Cai, Xiaodong Zhang, and Houfeng Wang, Bidirectional recurrent convolutional neural network for relation classification, Proceedings of the 54th Annual Meeting of the Association for Computational Linguistics, . 2016, 1:756-765.
Fenia Christopoulou, Makoto Miwa, and Sophia Ananiadou, Connecting the dots: Document-level neural relation extraction with edge-oriented graphs, Proceedings of the 2019 Conference on Empirical Methods in Natural Language Processing and the 9th International Joint Conference on Natural Language Processing (EMNLP-IJCNLP), . 2019, 4924-4935.
Kevin Clark, Urvashi Khandelwal, Omer Levy, and Christopher D. Manning, What does BERT look at? an analysis of BERT'S attention, 2019, ArXiv,abs/1906.04341.
Jacob Devlin, Ming-Wei Chang, Kenton Lee, and Kristina Toutanova, BERT: Pre-training of deep bidirectional transformers for language understanding, Proceedings of the 2019 Conference of the North American Chapter of the Association for Computational Linguistics: Human Language Technologies,. 2019a, 1:4171-4186.
Markus Eberts and Adrian Ulges, Span-based joint entity and relation extraction with transformer pre-training, 2019, arXiv:1909.07755.
Zhijiang Guo, Yan Zhang, and Wei Lu, Attention guided graph convolutional networks for relation extraction, Proceedings of the 57th Annual Meeting of the Association for Computational Linguistics, . 2019, 241-251.
Xu Han, Pengfei Yu, Zhiyuan Liu, Maosong Sun, and Peng Li, Hierarchical relation extraction with coarse-to-fine grained attention, Proceedings of the 2018 Conference on Empirical Methods in Natural Language Processing, 2018, 2236-2245.
Iris Hendrickx, Su Nam Kim, Zomitsa Kozareva, Preslav Nakov, Diarmuid O Seaghdha, Sebastian Pado, Marco Pennacchiotti, Lorenza Romano, and Stan Szpakowicz, SemEval-2010 task 8: Multi-way classification of semantic relations between pairs of nominals, Proceedings of the 5th International Workshop on Semantic Evaluation, 2010, 33-38.
Robin Jia, Cliff Wong, and Hoifung Poon, Document-level n-ary relation extraction with multiscale representation learning, Proceedings of the 2019 Conference of the North American Chapter of the Association for Computational Linguistics: Human Language Technologies, . 2019, 1:3693-3704.
Mandar Joshi, Danqi Chen, Yinhan Liu, Daniel S. Weld, Luke Zettlemoyer, and Omer Levy, Spanbert: Improving pre-training by representing and predicting spans, 2019, arXiv:1907.10529.
Jiao Li, Yueping Sun, Robin J. Johnson, Daniela Sciaky, Chih-Hsuan Wei, Robert Leaman, Allan Peter Davis, Carolyn J. Mattingly, Thomas C. Wiegers, and Zhiyong Lu, BioCreative V CDR task corpus: a resource for chemical disease relation extraction, Database, 2016, doi:10.1093/database/baw068.
Guoshun Nan, Zhijiang Guo, Ivan Sekulic, and Wei Lu, Reasoning with latent structure refinement for document-level relation extraction, 2020, arXiv:2005.06312.
Yinhan Liu, Myle Ott, Naman Goyal, Jingfei Du, Mandar Joshi, Danqi Chen, Omer Levy, Mike Lewis, Luke Zettlemoyer, RoBERTa: A robustly optimized BERT pretraining approach, 2019, arXiv:1907 11692.
Adam Paszke, Sam Gross, Soumith Chintala, Gregory Chanan, Edward Yang, Zachary DeVito, Zeming Lin, Alban Desmaison, Luca Antiga, and Adam Lerer, Automatic differentiation in pytorch, 31st Conference on Neural Information Processing Systems (NIPS 2017), 2017.
Nanyun Peng, Hoifung Poon, Chris Quirk, Kristina Toutanova, and Wen tau Yih, Cross-sentence N-ary relation extraction with graph LSTMs, Transactions of the Association for Computational Linguistics, 2017, 5:101-116.
Chris Quirk and Hoifung Poon, Distant supervision for relation extraction beyond the sentence boundary, Proceedings of the 15th Conference of the European Chapter of the Association for Computational Linguistics, 2017, 1:1171-1182.
Alec Radford, Jeff Wu, Rewon Child, David Luan, Dario Amodei, and Ilya Sutskever, Language models are unsupervised multitask learners, 2019.
Linfeng Song, Yue Zhang, Zhiguo Wang, and Daniel Gildea, N-ary relation extraction using graphstate LSTM, Proceedings of the 2018 Conference on Empirical Methods in Natural Language Processing, 2018, 2226-2235.
Hengzhu Tang, Yanan Cao, Zhenyu Zhang, Jiangxia Cao, Fang Fang, Shi Wang, and Pengfei Yin, HIN: hierarchical inference network for document-level relation extraction, 2020, arXiv:2003.12754.
Bayu Distiawan Trisedya, Gerhard Weikum, Jianzhong Qi, and Rui Zhang, Neural relation extraction for knowledge base enrichment, Proceedings of the 57th Annual Meeting of the Association for Computational Linguistics, 2019, 229-240.
Ashish Vaswani, Noam Shazeer, Niki Parmar, Jakob Uszkoreit, Llion Jones, Aidan N. Gomez, Lukasz Kaiser, and Illia Polosukhin, Attention is all you need, Proceedings of the 31st International Conference on Neural Information Processing Systems, 2017, 6000-6010.
David Wadden, Ulme Wennberg, Yi Luan, and Hannaneh Hajishirzi, Entity, relation, and event extraction with contextualized span representations, Proceedings of the 2019 Conference on Empirical Methods in Natural Language Processing and the 9th International Joint Conference on Natural Language Processing (EMNLP-IJCNLP), 2019, 5783-5788.
Hong Wang, Christfried Focke, Rob Sylvester, Nilesh Mishra, and William Wang, Fine-tune BERT for DocRED with two-step process, 2019, arXiv:1909.11898.
Linlin Wang, Zhu Cao, Gerard de Melo, and Zhiyuan Liu, Relation classification via multi-level attention CNNs, Proceedings of the 54th Annual Meeting of the Association for Computational Linguistics, 2016, 1:1298-1307.
Zhilin Yang, Zihang Dai, Yiming Yang, Jaime Carbonell, Russ R Salakhutdinov, and Quoc V Le, XLNET: Generalized autoregressive pretraining for language understanding, Advances in Neural Information Processing Systems 32 (NIPS 2019), 2019, 5754-5764.
Yuan Yao, Deming Ye, Peng Li, Xu Han, Yankai Lin, Zhenghao Liu, Zhiyuan Liu, Lixin Huang, Jie Zhou, and Maosong Sun, DocRED: A large-scale document-level relation extraction dataset, Proceedings of the 57th Annual Meeting of the Association for Computational Linguistics, 2019, 764-777.
Tom Young, Erik Cambria, Iti Chaturvedi, Hao Zhou, Subham Biswas and Minlie Huang, Augmenting end-to-end dialog systems with commonsense knowledge,thirty-Second AAAI Conference on Artificial Intelligence, 2018, 4970-4977.
Mo Yu, Wenpeng Yin, Kazi Saidul Hasan, Cicero dos Santos, Bing Xiang, and Bowen Zhou, Improved neural relation detection for knowledge base question answering, Proceedings of the 55th Annual Meeting of the Association for Computational Linguistics, 2017, 1:571-581.
Dmitry Zelenko, Chinatsu Aone, and Anthony Richardella, Kernel methods for relation extraction, Journal of Machine Learning Research, 2003, 3:1083-1106.
Daojian Zeng, Kang Liu, Siwei Lai, Guangyou Zhou, and Jun Zhao, Relation classification via convolutional deep neural network, Pro-

(56) References Cited

PUBLICATIONS ceedings of COLING 2014, the 25th International Conference on Computational Linguistics: Technical Papers, 2014, 2335-2344.

Yuhao Zhang, Victor Zhong, Danqi Chen, Gabor Angeli, and Christopher D. Manning, Position-aware attention and supervised data improve slot filling, Proceedings of the 2017 Conference on Empirical Methods in Natural Language Processing (EMNLP 2017), 2017, 35-45.

Yi Zhao, Huaiyu Wan, Jianwei Gao, and Youfang Lin, Improving relation classification by entity pair graph, Proceedings of The Eleventh Asian Conference on Machine Learning, Proceedings of Machine Learning Research, 2019, 101:1156-1171.

* cited by examiner

Relation Example
Document: [0] The Legend of Zelda : The Minish Cap ( ) is an action - adventure game and the twelfth entry in The Legend of Zelda series. [1] Developed by Capcom and Flagship , with Nintendo overseeing the development process , it was released for the Game Boy Advance handheld game console in Japan and Europe in 2004 and in North America and Australia the following year . [2] In June 2014 , it was made available on the Wii U Virtual Console . [3] The Minish Cap is the third Zelda game that involves the legend of the Four Sword , expanding on the story of and . [4] A magical talking cap named Ezlo can shrink series protagonist Link to the size of the Minish , a bug - sized race that live in Hyrule . [5] The game retains some common elements from previous Zelda installments , such as the presence of Gorons , while introducing Kinstones and other new gameplay features . [6] The Minish Cap was generally well received among critics . [7] It was named the 20th best Game Boy Advance game in an IGN feature , and was selected as the 2005 Game Boy Advance Game of the Year by GameSpot .
Head Entity: The Legend of Zelda
Tail Entity: Link
Relation: "Publisher"
Evidence Sentences: 0,3,4

FIG. 3

Table 1

| User | RE Ign F1 (%) | RE F1(%) | Evi F1(%) |
|---|---|---|---|
| BigOrange | 60.1 | 62.3 | - |
| nttmac | 60.2 | 63.3 | - |
| Ours | 60.3 | 62.5 | 50.5 |

FIG. 6

Table 2

| Model | Ign F1 (%) | RE F1(%) | Evi F1(%) |
|---|---|---|---|
| Context-Aware (Yao et al., 2019) | 48.94 | 51.09 | - |
| BERT Two-Step (Wang et al., 2019) | - | 54.42 | - |
| HIN-BERT (Tang et al., 2020) | 54.29 | 56.31 | - |
| BERT+LSR (Nan et al., 2020) | 52.43 | 59.00 | - |
| E2GRE (ours) | 55.22 | 58.72 | 47.12 |

FIG. 7

Table 3

| Model | Rec (%) | Prec(%) | F1(%) |
|---|---|---|---|
| Relation Extraction | | | |
| BERT + Joint Training | 53.33 | 55.79 | 54.54 |
| BERT-entity-guided | 54.07 | 60.43 | 57.08 |
| + Evidence Guided | 59.09 | 56.95 | 58.72 |
| Evidence Prediction | | | |
| BERT + Joint Training | 43.48 | 41.54 | 42.49 |
| BERT-entity-guided | 43.10 | 49.66 | 46.15 |
| + Evidence Guided | 48.26 | 49.47 | 47.14 |

FIG. 8

Table 4

| Model | Rec (%) | Prec(%) | F1(%) |
|---|---|---|---|
| Relation Extraction | | | |
| BERT-entity-guided | 54.07 | 60.43 | 57.08 |
| 3 Layers | 56.50 | 60.13 | 58.71 |
| 6 Layers | 61.87 | 54.14 | 58.51 |
| Evidence Prediction | | | |
| BERT-entity-guided | 43.1 | 49.66 | 46.15 |
| 3 Layers | 45.33 | 49.07 | 47.12 |
| 6 Layers | 46.34 | 48.19 | 46.9 |

FIG. 9

SYSTEM FOR ENTITY AND EVIDENCE-GUIDED RELATION PREDICTION AND METHOD OF USING THE SAME

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entirety and to the same extent as if each reference were individually incorporated by reference.

FIELD OF THE DISCLOSURE

The present disclosure relates generally to relation extraction, and more specifically related to entity and evidence guided relation extraction (E2GRE).

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Relation extraction (RE), which extracts relations between pairs of entities in plain text, is an important task in Natural Language Processing (NLP). It has downstream applications to many other NLP tasks, such as knowledge graph construction, information retrieval, question answering and dialogue systems. RE may be achieved by hand-built patterns, bootstrapping methods, supervised methods, distance supervision, and unsupervised method. Those methods often involve using neural models to learn the relations. Progress has been made on neural models for RE. However, those neural models and related database only considers intra-sentence relations.

Therefore, an unaddressed need exists in the art to address the aforementioned deficiencies and inadequacies.

SUMMARY OF THE DISCLOSURE

In certain aspects, the present disclosure relates to a system. In certain embodiments, the system includes a computing device, and the computing device has a processer and a storage device storing computer executable code. The computer executable code, when executed at the processor, is configured to:

provide a head entity and a document containing the head entity;

process the head entity and the document by a language model to obtain head extraction corresponding to the head entity, tail extractions corresponding to tail entities in the document, and sentence extraction corresponding to sentences in the document;

predict a head entity-tail entity relation between the head extraction and the tail extractions using a first bilinear layer;

combine the sentence extraction and a relation vector corresponding to the head extraction and the tail extraction using a second bilinear layer to obtain a sentence-relation combination;

predict an evidence sentence from the document using a third bilinear layer based on the sentence-relation combination and attention extracted from the language model, wherein the evidence sentence supports the head-tail relation; and update parameters of the language model and the first, second and third bilinear layers based on the predicted head entity-tail entity relation, the predicted evidence sentence, and labels of the document containing true head entity-tail entity relation and true evidence sentence.

In certain embodiments, the language model and the first, second and third bilinear layers are trained using a plurality of labeled documents, at least one of the labeled documents has E number of entities, the at least one of the labeled documents is expanded to E number of samples, each of the E number of samples comprises the at least one of the labeled documents and a head entity corresponding to one of the E number of entities, and E is a positive integer.

In certain embodiments, the computer executable code is configured to update the parameters based on a loss function, the loss function is defined by Loss=$L_{RE}+\lambda_1 *L_{Evi}^{\alpha}$, $L_{RE}$ is relation prediction loss, $L_{Evi}^{\alpha}$ is sentence prediction loss, $\lambda_1$ is a weight factor having a value equals to or greater than 0.

In certain embodiments, the language model comprises at least one of generative pre-training model (GPT), GPT-2, bidirectional encoder representations from transformers (BERT), robustly optimized BERT approach (roBERTa), and reparameterized transformer-XL network (XLnet).

In certain embodiments, the computer executable code is configured to extract the attention from last 2 to 5 layers of the language model. In certain embodiments, the computer executable code is configured to extract the attention from last 3 layers of the language model.

In certain embodiments, the first bilinear layer is defined by $\hat{y}_{ik}=\delta(h^T W_i t_k+b_i)$, $\hat{y}_{ik}$ is a predicted value of an i-th of a plurality of relations between head entity h and a j-th tail entity $t_k$, $\delta$ represents a sigmoid function, $W_i$ is learned weights of the first bilinear layer, and $b_i$ is a bias of the first bilinear layer. In certain embodiments, the second bilinear layer is defined by $\hat{y}_{jk}^i=\delta(f_{jk}^i W_o^r+b_o^r)$, $f_{jk}^i=s_j W_i^r r_i+b_i^r$, $\hat{y}_{jk}^i$ is a predicted possibility of a j-th sentence $s_j$ in the document being a supporting sentence with regard to an i-th relations $r_i$, $W_i^r/b_i^r$ and $W_o^r/b_o^r$ are learnable parameters of the second bilinear layer in regard to the i-th relation. In certain embodiments, the third bilinear layer is defined by $\hat{y}_k^{i\alpha}=\delta(\alpha_{sk} W_i^\alpha f_k^i+b_i^\alpha)$, $\hat{y}_k^{i\alpha}$ is predicted probability of the j-th sentence in the document being a support sentence to the i-th relation with regard to the k-th tail entity, $\delta$ represents a sigmoid function, $W_i^\alpha$ is learned weights of the third bilinear layer, and $b_i^\alpha$ is a bias of the third bilinear layer.

In certain embodiments, after training, the language model and the first, second and third bilinear layers are configured to provide relation prediction and evidence prediction for a query entry having a query head entity and a query document containing the query head entity.

In certain embodiments, the computer executable code is further configured to provide tail entities of the document.

In certain aspects, the present disclosure relates to a method. In certain embodiments, the method includes:

providing, by a computing device, a head entity and a document containing the head entity;

processing, by a language model stored in the computing device, the head entity and the document to obtain head extraction corresponding to the head entity, tail extraction corresponding to tail entities in the document, and sentence extraction corresponding to sentences in the document;

predicting, by a first bilinear layer stored in the computing device, a head-tail relation between the head extraction and the tail extraction;

combining, by a second bilinear layer stored in the computing device, the sentence extraction and a relation vector corresponding to the head extraction and the tail extraction, to obtain a sentence-relation combination; and predicting, by a third bilinear layer stored in the computing device, an evidence sentence from the document based on the sentence-relation combination and attention extracted from the language model, wherein the evidence sentence supports the head tail relation;

updating parameters of the language model and the first, second and third bilinear layers based on the predicted head entity-tail entity relation, the predicted evidence sentence, and labels of the document containing true head entity-tail entity relation and true evidence sentence.

In certain embodiments, the step of updating the parameters is performed based on a loss function, the loss function is defined by Loss=$L_{RE}+\lambda_1 *L_{Evi}^{\alpha}$, $L_{RE}$ is relation prediction loss, $L_{Evi}^{\alpha}$ is sentence prediction loss, $\lambda_1$ is weight factor having a value equals to or greater than 0.

In certain embodiments, the language model comprises at least one of generative pre-training model (GPT), GPT-2, bidirectional encoder representations from transformers (BERT), robustly optimized BERT approach (roBERTa), and reparameterized transformer-XL network (XLnet).

In certain embodiments, the attention is extracted from the last 3 layers of the language model.

In certain embodiments, the first bilinear layer is defined by $\hat{y}_{ik}=\delta(h^T W_i t_k+b_i)$, $\hat{y}_{ik}$ is a predicted value of an i-th of a plurality of relations between head entity h and a j-th tail entity $t_k$, $\delta$ represents a sigmoid function, $W_i$ is learned weights of the first bilinear layer, and $b_i$ is a bias of the first bilinear layer; the second bilinear layer is defined by $\hat{y}_{jk}^i=\delta(f_{jk}^i W_o^r+b_o^r)$, $f_{jk}^i=s_j W_i^r r_i+b_i^r$, $\hat{y}_{jk}^i$ is a predicted possibility of a j-th sentence $s_j$ in the document being a supporting sentence with regard to an i-th relations $r_i$, $W_i^r/b_i^r$ and $W_o^r/b_o^r$ are learnable parameters of the second bilinear layer in regard to the i-th relation; and the third bilinear layer is defined by $\hat{y}_k^{i\alpha}=\delta(\alpha_{sk} W_i^\alpha f_k^i+b_i^\alpha)$, $\hat{y}_k^{i\alpha}$ is predicted probability of the j-th sentence in the document being a support sentence to the i-th relation with regard to the k-th tail entity, $\delta$ represents a sigmoid function, $W_i^\alpha$ is learned weights of the third bilinear layer, and $b_i^\alpha$ is a bias of the third bilinear layer.

In certain embodiments, the method further includes, after well training: providing relation prediction and an evidence prediction for a query entry, where the query entry has a query head entity and a query document containing the query head entity.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 3 shows an example of an entry from DocRED database.

FIG. 6 shows top public leaderboard numbers on DocRED, where our E2GRE method uses RoBERTa-large.

FIG. 7 shows results of relation extraction on the supervised setting of DocRED, where comparisons are made between E2GRE and other published models on the validated set with BERT-base as the pretrained language model.

FIG. 8 shows ablation study on the entity-guided vs evidence-guided RE, where BERT+Joint Training is the BERT baseline with joint training of RE and evidence prediction, and result are evaluated on the validation set.

FIG. 9 shows ablation study on different numbers of layers of attention probabilities from BERT that are used for evidence prediction. Results are evaluated on the development set.

DETAILED DESCRIPTION

Figure 1:
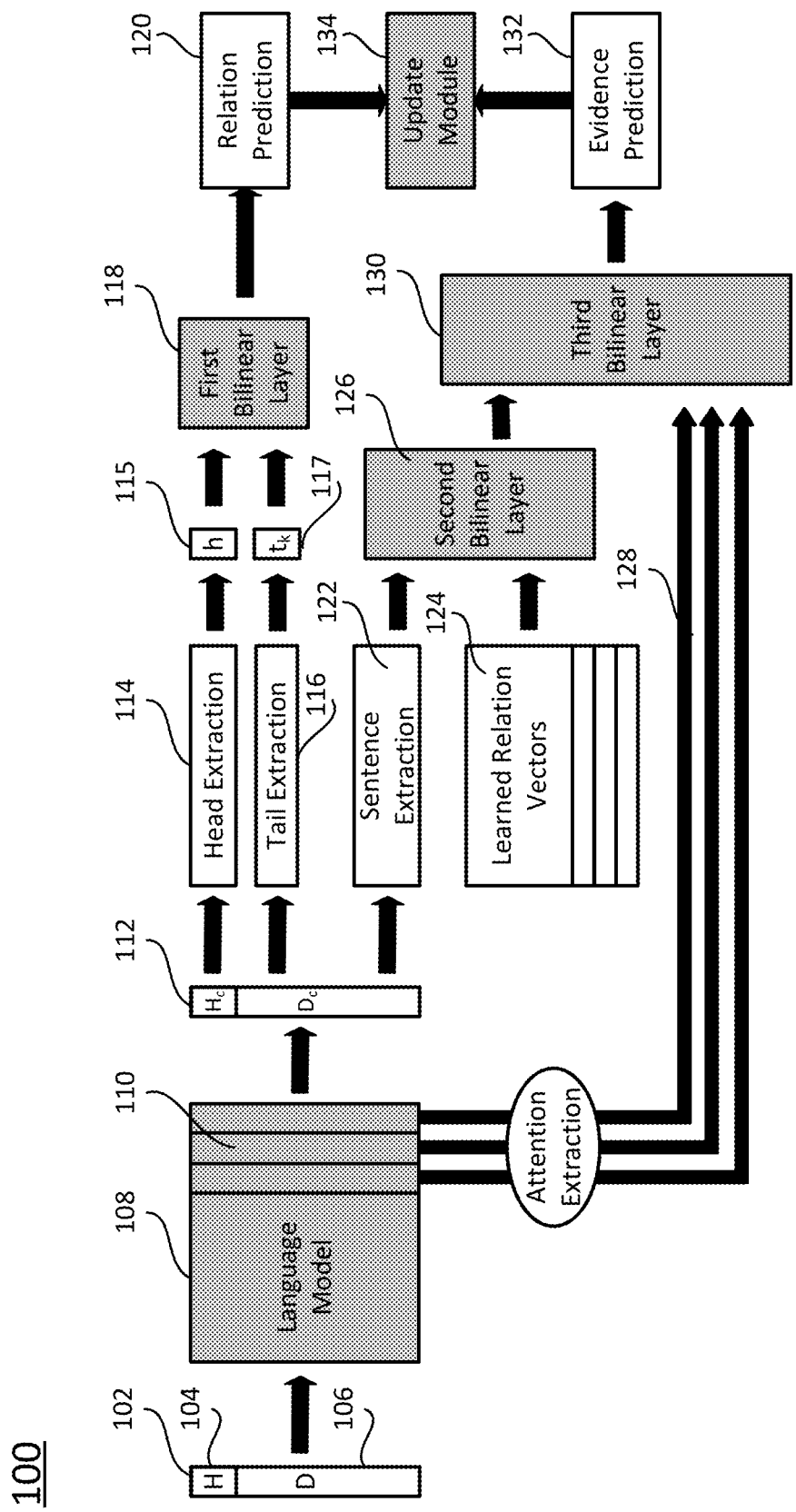
FIG. 1 schematically depicts an evidence guided multi-task learning framework according to certain embodiments of the disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure relates to a joint training framework E2GRE. In certain embodiments, first, the disclosure introduces entity-guided sequences as inputs to a pretrained language model (LM), such as bidirectional encoder representations from transformers (BERT) and robustly optimized BERT approach (roBERTa). The entity-guided sequences help the LM to focus on areas of the document related to the entity. Secondly, the disclosure guides the fine-tuning of the pretrained LM by using its internal attention probabilities as additional features for evidence prediction. As a result, the approach of the disclosure encourages the pretrained LM to focus on the entities and supporting/evidence sentences. In certain embodiments, the disclosed E2GRE is evaluated on DocRED, a recently released large-scale dataset for relation extraction. The E2GRE is able to achieve the state-of-the-art results on the public leaderboard across all metrices, showing that E2GRE is both effective and synergistic on relation extraction and evidence prediction.

Specifically, in the E2GRE, for each entity in a document, the disclosure generates a new input sequence by appending the entity to the beginning of a document, and then feeds it into the pretrained LM. Thus, for each document with $N_e$ entities, the disclosure generates $N_e$ entity-guided input sequences for training. By introducing these new training inputs, the disclosure encourages the pretrained LM to focus on the entity that is appended to the start of the document. The disclosure further exploits the pretrained LM by directly using internal attention probabilities as additional features for evidence prediction. The joint training of relation extraction and evidence prediction helps the model locate the correct semantics that are required for relation extraction. Both of these strategies take advantage of pretrained LMs in order to make full use of pretrained LMs for our task. The main contribution of the E2GRE approach includes, among other things: (1) For every document, the disclosure generates multiple new inputs to feed into a pretrained language model: the disclosure concatenates every entity with the document and feeds it as an input sequence to the LM. This allows the finetuning of the internal representations from the pretrained LM to be guided by the entity. (2) The disclosure further uses internal BERT attention probabilities as additional features for the evidence prediction. This allows the finetuning of the internal representations from the pretrained LM to be also guided by evidence/supporting sentences.

Each of these strategies gives a significant boost in performance and by combining them, the disclosure is able to achieve the state-of-the-art results on DocRED leaderboard.

FIG. 1 schematically depicts an E2GRE framework according to certain embodiments of the present disclosure. As shown in FIG. 1, the framework 100 includes a language model 108, a first bilinear layer 118, a second bilinear layer 126, a third bilinear layer 130, and an update module 134. The language model 108, the first bilinear layer 118, the second bilinear layer 126, the third bilinear layer 130 and the update module 134 are also collectively named the E2GRE model or the model. A sample 102 can be provided to the language model 108, which could be a training sample or a query sample. In certain embodiments, the disclosure organizes the sample 102 by appending a head entity 104 to the beginning of a document or context 106. The head entity 104 is also contained in the document 106. In certain embodiments, the disclosure may also organize the sample into head entity 104, tail entities, and document 106. However, it is advantageous to not define the tail entities in preparing the sample, so that preparation of the samples and operating of the framework is more efficient. In certain embodiments, the sample is prepared into the sequence of: "[CLS]"+H+"[SEP]"+D+"[SEP]", where [CLS] is the class token placed at the beginning of the entity-guided input sample, [SEP] is a separator, H is the tokens of the first mention of a single entity, and D is the document tokens. There are a total of $N_e$ entities in the document D, including the head entity H and $N_e-1$ tail entities, where $N_e$ is a positive integer.

In certain embodiments, the language model 108 is BERT. Due to the constraint that BERT can only handle a sequence with a maximum length of 512 tokens, if the length of the training input is longer than 512, the disclosure makes use of a sliding window approach over the document. If the input sequence is longer than 512, the embodiments break it into two sequences or two documents. In certain embodiments, the embodiments may break longer passages into more windows. The first sequence is the original input sequence up to 512 tokens. The second sequence is the same format as the first, with an offset added to the document, so that it can reach the end. This would look like "[CLS]"+H+"[SEP]"+D[offset:end]+"[SEP]". The embodiments combine these two input sequences in our model by averaging the embeddings and the BERT attention probabilities of the tokens, where the embeddings and the BERT attention probabilities have been computed twice in the model.

In certain embodiments, when the sample 102 is a training sample, the training sample 102 also includes labels of tail entities, relations, and evidence sentences supporting the relations. Those labels can be used, for example, by the second bilinear layer 126 to retrieve a relation vector corresponding to a head entity and a tail entity, or by the update module 134 for calculate a loss function corresponding to the training sample, the predicted relation, and the predicted evidence sentences.

The sample 102 is inputted to the language model 108. In certain embodiments, the language model 108 is a pretrained language models (LM). LMs are extremely powerful tools that have emerged in recent years. More recent pretrained LMs are transformer-based, trained with an enormous amount of data. In certain embodiments, the language model 108 can be any one of the language models, such as generative pre-training model (GPT), GPT-2, bidirectional encoder representations from transformers (BERT), robustly optimized BERT approach (roBERTa), and reparameterized transformer-XL network (XLnet).

The language model 108 processes the input 102, and produces the output sequence 112. Head entity 115 can be extracted from the output sequence 112 by head extraction 114, and tail entities 117 can be extracted from the output sequence 112 by tail extraction 116. The head extraction 114 averages the embeddings over the concatenated head entity tokens to obtain the head entity embedding h. The tail extraction 116 extracts a set of tail entity embeddings from the output sequence. For the k-th tail entity embedding $t_k$, the tail extraction 116 locates the indices of the tokens of the k-th tail entity, and averages the output embeddings of BERT at these indices to get $t_k$.

After obtaining the head entity embedding $h \in \mathbb{R}^d$ and all tail entity embeddings $\{t_k | t_k \in \mathbb{R}^d\}$ in an entity-guided sequence, where $1 \leq k \leq N_e-1$ and $\mathbb{R}^d$ is a real number with d dimensions, the embodiments use a first bilinear layer 118 with sigmoid activation function to predict the probability of i-th relation between the head entity h and the k-th tail entity $t_k$, denoted by $\hat{y}_{ik}$, as:

$$\hat{y}_{ik} = \delta(h^T W_i t_k + b_i) \quad (1),$$

where $\delta$ is the sigmoid function, T of $h^T$ is transpose, $W_i$ and $b_i$ are the learnable parameters corresponding to i-th relation, $1 \leq i \leq N_r$, and $N_r$ is a positive integer representing the total number of relations.

The language model 108 such as BERT can be further fined-tuned with a multi-label cross-entropy loss of:

$$L_{RE} = -\frac{1}{N_r} \frac{1}{N_e-1} \sum_{k=1}^{N_e-1} \sum_{i=1}^{N_r} (y_{ik} \log(\hat{y}_{ik}) + (1-y_{ik}) \log(1-\hat{y}_{ik})), \quad (2)$$

where $y_{ik}$ is the true value or label of the i-th relation in the training sample and $\hat{y}_{ik}$ is the predicted value of the i-th relation with respect to the head entity h and the k-th tail entity $t_k$.

During inference, the goal of relation extraction is to predict a relation for each pair of head/tail entity within a document. For a given entity-guided input sequence of "[CLS]"+entity+"[SEP]"+document+"[SEP]", the output of the model is a set of $N_e-1$ relation predictions. The embodiments combine the predictions from every sequence generated from the same document and with different head entity, so as to obtain all relation predictions over the document.

The output of the first bilinear 118 is the relation prediction 120. In certain embodiments, when the predicted value $\hat{y}_{ik}$ equals to or is greater than 0.5, that relation is defined as the predicted relation. In certain embodiments, when all the predicted value of the relations is less than 0.5, it indicates that the corresponding head entity and tail entity has no relation. In certain embodiments, relation predicted by relation extraction is used to query the correct relation vectors during inference/test time.

Referring to FIG. 1, the sentence extraction 122, together with the obtained relation prediction 120, can be used to predict evidence/supporting sentences. The evidence sentences contain supporting facts that are important for the model to predict the correct relationships between head and tail entities. Therefore, the task of evidence prediction is a good auxiliary task to relation extraction and provides explainability for the multitask model.

The objective of evidence prediction is to predict whether a given sentence is evidence/supporting for a given relation. Given a sentence s, the embodiments first obtain the sentence embedding $s \in \mathbb{R}^{N_s \times d}$ by averaging all the embeddings of the words in the sentence s. These embeddings are the sentence extraction 122 computed from the output of the language model 108. Meanwhile, for the i-th relation ($1 \leq i \leq N_r$), the embodiments define a vector $r_i \in \mathbb{R}^d$ as the relation embedding. These relation embeddings $r_i$, or the relation vectors 124, are initialized randomly and learnt from the model. Here $\mathbb{R}^d$ is a real number with d dimensions.

The embodiments then employ the second bilinear layer 126 using the sentence embedding 122 and the relation embeddings 124. Specifically, the second bilinear layer 126 with sigmoid activation function is used to predict the probability of the j-th sentence $s_j$ being a supporting sentence with regard to the given i-th relation $r_i$ as follow:

$$f_{jk}^i = s_j W_i^r r_i + b_i^r$$

$$\hat{y}_{jk}^i = \delta(f_{jk}^i W_o^r + b_o^r) \quad (3)$$

where $s_j$ and $r_i$ are respectively represent the embeddings of the j-th sentence and the i-th relation, $\hat{y}_{jk}^i$ is a predicted possibility of the j-th sentence $s_j$ in the document being a supporting sentence with regard to the i-th relations $r_i$, $W_i^r/b_i^r$ and $W_o^r/b_o^r$ are learnable parameters of the second bilinear layer in regard to the i-th relation. In certain embodiments, the learnable parameters $W_i^r$ and $W_o^r$ are named weights, and the learnable parameters $b_i^r$ and $b_o^r$ are named biases.

Finally, suppose there are $N_s$ sentences in the given context, the embodiments define the loss of evidence prediction under a given relation i as follows:

$$L_{Evi} = -\frac{1}{N_t} \frac{1}{N_s} \sum_{k=1}^{N_t} \sum_{j=1}^{N_s} \left( y_{jk}^i \log(\hat{y}_{jk}^i) + (1 - y_{jk}^i) \log(1 - \hat{y}_{jk}^i) \right) \quad (4)$$

where $y_{jk}^i \in \{0,1\}$, and $y_{jk}^i = 1$ when sentence j is an evidence sentence for inferring the i-th relation. It should be noted that in training stage, the model uses the embedding of true relation in equation (3). In testing stage, the model uses the embedding of the relation predicted by relation extraction model in equation (1).

The model can be further fine-tuned with internal attention probabilities of the language model 108, such as BERT. In certain embodiments, BERT attention probabilities determine where in the document the BERT model would focus on. Therefore, these attention probabilities can guide the language model 108 to focus on the relevant area in the document for relation extraction. In certain embodiments, the disclosure discovers that the areas with higher attention values are usually coming from the supporting sentences. Therefore, in certain embodiments, these attention probabilities are helpful for evidence prediction. For each pair of head h and tail $t_k$, the disclosure makes use of the attention probabilities extracted from the last l internal BERT layers for evidence prediction.

In certain embodiments, let $Q \in \mathbb{R}^{N_h \times L \times (d/N_h)}$ be the query and $K \in \mathbb{R}^{N_h \times L \times (d/N_h)}$ be the key of the multi-head self-attention layer, $N_h$ be the number of attention heads as described in Vaswani et al., 2017 (which is incorporated herein by reference in its entirety), and L be the length of the entity-guided input sequence, and d be the embedding dimensions. The disclosure first extracts the output of multi-headed self-attention (MHSA) $A \in \mathbb{R}^{N_h \times L \times L}$ from a given layer in BERT as follows (attention extraction 128 in FIG. 1):

$$\text{Attention} = \text{softmax}\left(\frac{QK^T}{\sqrt{d/N_h}}\right) \quad (5)$$

$$\text{Att-head}_i = \text{Attention}(QW_i^Q, KW_i^k) \quad (6)$$

$$A = \text{Concat}(\text{Att-head}_1, \ldots, \text{Att-head}_n) \quad (7)$$

For each pair of head h and tail $t_k$, certain embodiments of the disclosure extract the attention probabilities corresponding to head and tail tokens to help relation. Specifically, the embodiments concatenate the MHSAs for the last l BERT layers extracted by equation (7) to form an attention probability tensor as: $\hat{A}_k \in \mathbb{R}^{l \times N_h \times L \times L}$.

Then, the embodiments calculate the attention probability representation of each sentence under a given head-tail entity pair as follows.

1. The embodiments first apply maximum pooling layer along the attention head dimension (i.e., second dimension) over $\tilde{A}_k$. The max values are helpful to show where a specific attention head might be looking at. Afterwards, the embodiments apply mean pooling over the last l layers. The embodiments obtain $$\tilde{A}_k = \frac{1}{l} \sum_{i=1}^{l}$$

maxpool $(\tilde{A}_{ki})$, $\tilde{A}_k \in \mathbb{R}^{L \times L}$ from these two steps.

2. The embodiments then extract the attention probability tensor from the head and tail entity tokens according to the start and end positions of [page 5 line 483-please define of "what"] in the document. The embodiments average the attention probabilities over all the tokens for the head and tail embeddings to obtain $\tilde{A}_{sk} \in \mathbb{R}^L$.

3. Finally, the embodiments generate sentence representations from $\tilde{A}_{sk}$ by averaging over the attentions of each token in a given sentence from the document to obtain $\alpha_{sk} \in \mathbb{R}^{N_s}$.

After getting the attention probabilities $\alpha_{sk}$, the embodiments combine $\alpha_{sk}$ with the evidence prediction result $\hat{y}_{jk}^i$ of sentence s from equation (3) to form the new sentence representation and feed it into a bilinear layer with sigmoid for evidence sentence prediction as follows:

$$\hat{y}_k^{i\alpha} = \delta(\alpha_{sk} W_i^\alpha f_k^i + b_i^\alpha) \quad (8)$$

where $f_k^i$ is the vector of fused representation of sentence embeddings and relation embeddings for a give head/tail entity pair.

Finally, the embodiments define the loss of evidence prediction under a given i-th relation based on attention probability representation as follows:

$$L_{Evi}^a = -\frac{1}{N_t} \frac{1}{N_s} \sum_{k=1}^{N_t} \sum_{j=1}^{N_s} \left( y_{jk}^{i\alpha} \log(\hat{y}_{jk}^{i\alpha}) + (1 - y_{jk}^{i\alpha}) \log(1 - \hat{y}_{jk}^{i\alpha}) \right) \quad (9)$$

where $\hat{y}_{jk}^{i\alpha}$ is the j-th value of $\hat{y}_k^{i\alpha}$ computed by equation (8).

The embodiments combine the relation extraction loss and the attention probability guided evidence prediction loss as the final objective function for the joint training:

$$\text{Loss} = L_{RE} + \lambda_1 * L_{Evi}^\alpha \quad (10)$$

where $L_{RE}$ is relation prediction loss, $L_{Evi}^\alpha$ is evidence prediction loss, $\lambda_1 \geq 0$ is a weight factor to make trade-offs between the two losses, which are data dependent. In other words, instead of using the loss functions of equations (2) and (9), the disclosure uses the loss function of equation (10) to the whole model, that is, the combination of equations (2) and (9).

Figure 2:
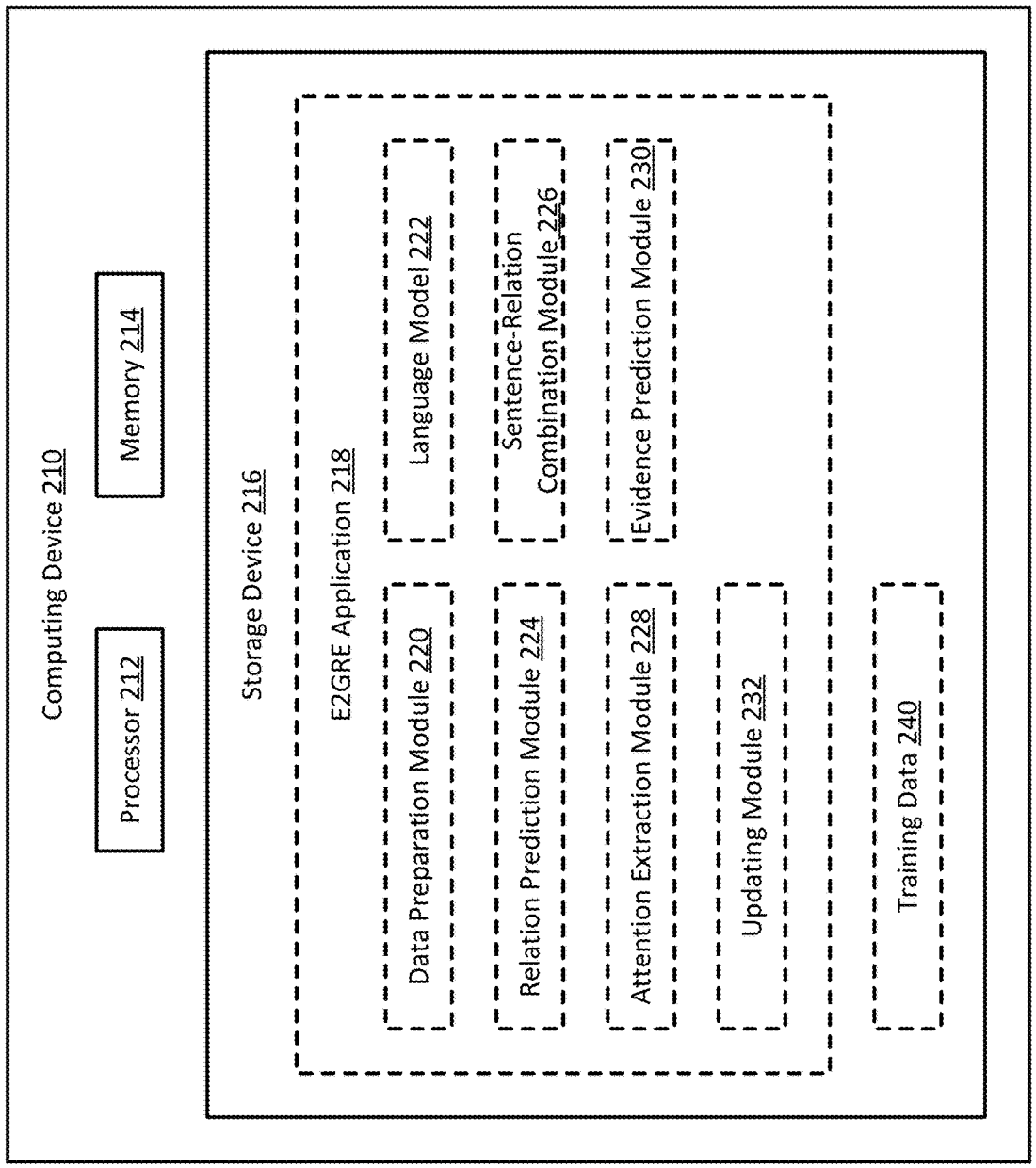
FIG. 2 schematically depicts a system for evidence guided relation extraction according to certain embodiments of the present disclosure.

FIG. 2 schematically depicts an E2GRE system according to certain embodiments of the present disclosure. The E2GRE performs both relation prediction and evidence prediction. As shown in FIG. 2, the system 200 includes a computing device 210. In certain embodiments, the computing device 210 may be a server computer, a cluster, a cloud computer, a general-purpose computer, a headless computer, or a specialized computer, which provides relation prediction and evidence prediction. The computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In certain embodiments, the computing device 210 may have more than one CPU as the processor, such as two CPUs, four CPUs, eight CPUs, or any suitable number of CPUs.

The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214. In certain embodiments, the computing device 210 may further include graphic card to assist the processor 212 and the memory 214 with image processing and display.

The storage device 216 is a non-volatile data storage media for storing the OS (not shown) and other applications of the computing device 210. Examples of the storage device 216 may include non-volatile memory such as flash memory, memory cards, USB drives, hard drives, floppy disks, optical drives, solid-state drive, or any other types of data storage devices. In certain embodiments, the computing device 210 may have multiple storage devices 216, which may be identical storage devices or different types of storage devices, and the applications of the computing device 210 may be stored in one or more of the storage devices 216 of the computing device 210.

In this embodiments, the processor 212, the memory 214, and the storage device 216 are component of the computing device 210, such as a server computing device. In other embodiments, the computing device 210 may be a distributed computing device and the processor 212, the memory 214, and the storage device 216 are shared resources from multiple computing devices in a pre-defined area.

The storage device 216 includes, among other things, a multitask prediction application 218 and training data 240. In certain embodiments, the E2GRE application 218 is also named as the E2GRE model, which includes model weights that can be trained using training data, and the model can be used to make predictions using the well-trained model weights. The training data 240 is optional for the computing device 210, as long as the training data stored in other devices is accessible to the E2GRE application 218.

As shown in FIG. 2, the E2GRE application 218 includes a data preparation module 220, a language model 222, a relation prediction module 224, a sentence-relation combination module 226, an attention extraction module 228, an evidence prediction module 230, and an updating module 232. In certain embodiments, the E2GRE application 218 may include other applications or modules necessary for the operation of the E2GRE application 218, such as an interface for the user to enter a query to the E2GRE application 218. It should be noted that the modules 220-232 are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained using training data, and after well trained, can be used to make a prediction.

The data preparation module 220 is configured to prepare training samples or query data, and send the prepared training sample or query data to the language module 222. The prepared training sample inputted to the language module 222 include a head entity and a document or context containing the head entity. In certain embodiments, the inputted training sample is in the format of "[CLS]"+head entity+"[SEP]"+document+"[SEP]". The head entity may be one word or a few words, such as the head entity "New York City" or the head entity "Beijing". The prepared query data or query sample has the same format as the training sample. Although only the head entity and the document in each training sample are used as input of the language model 222, the labels for the tail entity, the tail entity, the relation between the head entity and the tail entity, and the evidence sentences are available for calculating loss functions and back propagation in the training process, such that the parameters of the model can be optimized. Here the model corresponds to the E2GRE application 218.

In certain embodiments, an example of a training data set may be a document containing multiple entities and multiple relations between the entities, and the data preparation module 220 is configured to split the example into multiple training samples. For example, if the example includes a document having 20 entities, the data preparation module 220 may be configured to provide 20 training samples. Each training sample includes one of the 20 entities as the head entity, the document, the relation between the head entity and the corresponding tail entity from the 20 entities, and evidence sentences in the document that support the relation. If one head entity has no relation to any of the other entities, the sample may also be provided as a negative sample. Each of the several samples can be used separately for the training process. By expanding one example to multiple training samples, the present disclosure improves training efficiency.

FIG. 3 shows a DocRED sample for training. As shown in FIG. 3, the document includes seven sentences, and has a head entity of "The Legend of Zelda" and a tail entity of "Link." The relation between the head entity and the tail entity is "Publisher." The relation is supported by the sentences 0, 3 and 4.

Referring back to FIG. 2, in certain embodiments, the data preparation module 220 may prepare the input sample in the form of "[CLS]"+head entity+"[SEP]"+tail entity+"[SEP]"+document+"[SEP]" instead of the form of "[CLS]"+head entity+"[SEP]"+document+"[SEP]". However, the samples without defining tail entity is preferred. By defining only head entity and the document as input, the training process is sped up, and the model parameters converge faster. In certain embodiments, data preparation module 220 is configured to store the prepared training samples in the training data 240.

The language model 222 is configured to, upon receiving one of the training samples from the data preparation module 220, process the training sample to obtain an output sequence, and provide the output sequence to the relation prediction module 224 and the sentence-relation combination module 226. In certain embodiments, the output sequence is a number of vectors, and the vectors correspond to the head entity, the words in the document, and the [CLS] or [SEP] tokens. The vectors are also called embeddings, and those embeddings are contextualized. The language model 222 can be any pretrained language models, for example, GPT (Radford et al., 2018, Improving language understanding by generative pre-training), GPT-2 (Radford et al., 2019, Language models are unsupervised multitask learners), BERT (Devlin et al., 2018, BERT: pre-training of deep bidirectional transformers for language understanding), roBERTa (Liu et al., 2019, RoBERTa: a robustly optimized BERT pretraining approach), and XLnet (Yang et al., 2019, XLNet: generalized autoregressive pretraining for language understanding), the cited references are incorporated herein by reference in their entirety. In certain embodiment, the language model 222 is BERT base, where L=12, H=768, A=12. L is the number of stacked encoders, H is the hidden size and A is the number of heads in the MultiHead Attention layers. In certain embodiments, the language model 222 is BERT large, where L=24, H=1024, A=16. The vectors represents features of the words, such as the meaning of the words and the locations of the words.

The relation prediction module 224 is configured to, when the output sequence is available, extract the head entity from the output sequence, extract the tail entities from the output sequence, run a first bilinear analysis on the vectors of the extracted head and tail entities to obtain a relation prediction, and provide the relation prediction to the sentence-relation combination module 226 and the updating module 232. In certain embodiments, the extracted head entity is a vector. When the head entity contains several words, and the representation of the head entity in the output sequence is therefore several vectors, the several vectors are averaged as the extracted head entity representation. In certain embodiments, the extraction of the tail entity may be performed using, for example, Named Entity Recognizer. The extracted tail entity is a vector. Since there may be multiple tail entities in the document, there are multiple tail entity representations. The representations are vectors, and the several vectors in the output sequence are averaged to obtain the extracted tail entity. Therefore, the vector of the tail entity is determined by its text and its location. In certain embodiments, the extracted head entity is excluded from the extracted tail entities. In certain embodiments, when the head entity and the tail entities are extracted, the relation prediction module 224 is configured to perform relation prediction using equation (1) described above. The extracted head entity and the extracted tail entities form multiple head entity-tail entity pairs, and the relation prediction is performed for each pair. For each head entity-tail entity pair, the bilinear analysis would provide a result for each of the relations. If the result for any of the relations in regard to the head entity-tail entity pair is in a range of 0 to 1. In certain embodiments, when the result equals to or is greater than 0.5, it indicates that the head entity-tail entity pair has the corresponding relation. Otherwise, the head entity-tail entity pair does not have the corresponding relation. In certain embodiments, if the results for more than one relation in regard to the head entity-tail entity pair equal to or are greater than 0.5, it indicates that the head entity-tail entity pairs has more than one relation. If all the results of the relations in regard to a head entity-tail entity pair is smaller than 0.5, then it indicates that there is no relation between the head entity and the tail entity. During training, the relation prediction module 224 does not need to provide the predicted relation between a head entity and a tail entity to the sentence-relation combination module 226 because the sentence-relation combination module 226 would use the labels of the training sample to determining whether the head entity and the tail entity has any relation, and if so, what relation it is. In contrast, during real prediction, the relation prediction module 224 would provide the predicted relation to the sentence-relation combination module 226. Specifically, the predicted/true relations are indices that are used to query which the correct relation vector to use.

The sentence-relation combination module 226 is configured to, when the output sequence is available, extract sentences from the output sequence, provide relation vectors, combine the extracted sentences and the corresponding relation vector through a second bilinear layer, and provide the combination to the evidence prediction module 230. The document include multiple sentences, and the output sequence includes vectors for the words in the sentences. Generally, one word corresponds to one vector, but a long word or a special word may also be split and represented by two or more vectors. The sentence extraction is performed by averaging the word vectors corresponding to the words in that sentence, so as to obtain the one vector for the sentence. The relation vectors correspond to the relations defined in the model, and the value of the relation vectors may be randomly initialized during the beginning of the training process. The values of the relation vectors can then be updated during the training process. Each relation has a corresponding relation vector. During training, when a head entity-tail entity pair is analyzed and predicted with a relation, the true relation corresponding to the head entity-tail entity pair can be obtained from the training data label, and the relation vector corresponding to the true relation is selected for the combination. During real prediction, when the head entity-tail entity pair is analyzed and predicted with a relation, the predicted relation corresponds to a relation vector, and the relation vector corresponding to the predicted relation is selected for the combination. After the selection of the relation vector, the sentence-relation combination module 226 is configured to combine the sentence extraction and the selected relation vector using the equation (3) described above. For example, if there are 4 sentences and the selected relation vector corresponding to the true relation or the predicted relation has 100 dimensions, the combination will be 4 sentence vectors with 100 dimensions. After the combination, the sentence-relation combination module 226 is further configured to send the combination to the evidence prediction module 230.

The attention extraction module 228 is configured to, after the operation of the language model 222, extract attention probabilities from the last l layers of the language model 222, and send the extracted attention probabilities to the evidence prediction module 230. In certain embodiments, the language model 222 is BERT base, and l is in a range from 2 to 5. In one embodiment, the language model 222 is BERT base, and l is 3. In certain embodiments, l can be other values depending on the specific language model used. In certain embodiments, the disclosure uses the attention probability values from the BERT Multi-Head attention layers as attention extraction.

The evidence prediction module 230 is configured to, upon receiving the combination of sentence extraction and relation vector from the sentence-relation combination module 226 and the extracted attention probabilities from the attention extraction module 228, perform a third bilinear analysis on the combination and the extracted attention probabilities, so as to obtain evidence prediction, and provide the evidence prediction to the updating module 232. The evidence prediction provides the sentences that are most relevant to the corresponding relations. In certain embodiments, the third bilinear analysis is performed using the equation (9).

The updating module 232 is configured to, when the relation prediction is obtained by the relation prediction module 224 and the evidence prediction is obtained by the evidence prediction module 230, calculate loss function using the relation prediction result, evidence prediction result, and training data labels of the true relation and true evidence sentences, and perform back propagation to update the model parameters of the language model 222, the relation prediction module 224, the sentence-relation combination module 226, the attention extraction module 228, and the evidence prediction module 230. In certain embodiments, the loss function is in the form of equation (12). In certain embodiments, after the update of the model parameters, the training process using the same training sample may be performed again using the new parameters. In other words, for each training sample, there may be several round of training to obtain optimized model parameters. The repetitive rounds of training may be ended for one training sample after a predetermined number of rounds or after the model parameters are converged.

Figure 4:
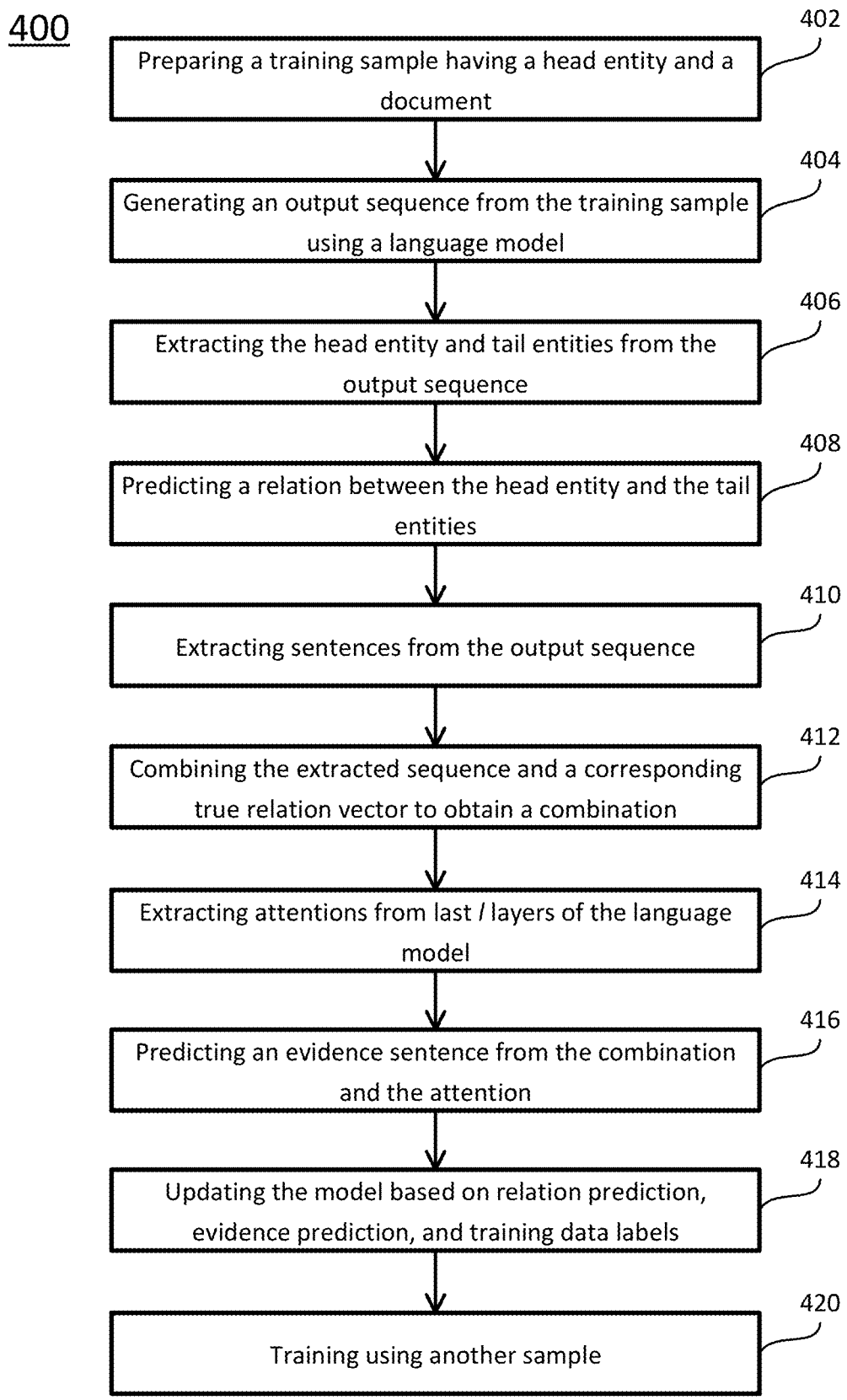
FIG. 4 schematically depicts a process for training the evidence guided relation extraction according to certain embodiments of the present disclosure.

FIG. 4 schematically depicts a training process for multitask prediction according to certain embodiments of the present disclosure. In certain embodiments, the training process is implemented by the server computing device shown in FIG. 2. It should be particularly noted that, unless otherwise stated in the present disclosure, the steps of the training process or method may be arranged in a different sequential order, and are thus not limited to the sequential order as shown in FIG. 4.

As shown in FIG. 4, at procedure 402, data preparation module 220 prepares a training sample, and sends the training sample to the language model 222. The training sample inputted into the language model 222 is in a form of a head entity and a document, such as "[CLS]"+head entity+"[SEP]"+document+"[SEP]". Further, the labels of the tail entity, the relation and the evidence sentences in the training sample are available for the updating module 232 to calculate loss functions and back propaganda. In certain embodiments, the data preparation module 220 may prepare the input sample in the form of head entity, tail entity and document instead of head entity and the document. But the training sample without defining the tail entity is preferred.

At procedure 404, upon receiving the inputted training sample, the language model 222 processes the inputted training sample to obtain an output sequence, and provides the output sequence to the relation prediction module 224 and the sentence-relation combination module 226. The input sample is in text format, and the output sequence is in vector format. The output sequence has the vectors corresponding to the head entity, the vectors corresponding to the words in the document, and vectors corresponding to the [CLS] or [SEP] tokens that indicate the start of the sample, the end of the sample, the separation between the head entity and the context, and the separation between sentences in the context. The language model 222 may be any suitable pre-trained language model, for example, GPT, GPT-2, BERT, roBERTa, and XLNet. Referring back to FIG. 1, the language model has multiple layers, and the last k layers 110 are used for attention extraction.

At procedure 406, the relation prediction module 224 extracts the head entity from the output sequence, and extracts tail entities from the output sequence. The extracted head entity and tail entities are vectors. Because the head entity is defined in the inputted sample and placed after the [CLS] token, it is straightforward to extract the head entity from the output sequence. The relation prediction module 224 also extract multiple tail entities from the context part of the output sequence. In certain embodiments, the tail entities may also be provided in preparing the training sample. In certain embodiments, the relation prediction module 224 identifies and classifies the key elements from the context as tail entities. For example, the tail entities may correspond to locations, corporations, person names, date, and time. In certain embodiments, the tail entities are extracted using Named Entity Recognizer. In certain embodiments, the extracted head entity is excluded from the extracted tail entities.

At procedure 408, upon extraction of the head entity and the tail entities, the relation prediction module 224 predicts a relation between the extracted head entity and each of the extracted tail entities, provides the head-entity-tail entity pair to the sentence-relation combination module 226, and provides the predicted relation to the updating module 232. In certain embodiments, the relation prediction module 224 performs pairwise relation prediction between the head entity and each of the tail entities. For each head entity-tail entity pair, the relation prediction module 224 uses a bilinear layer to produce a predicted value for each of the relations. The total number of relations may vary, for example, 97 relations listed in DocRED. When the value of one of the multiple relations for the head entity-tail entity pair equals to or is greater than 0.5, the head entity-tail entity is defined as having that relation. In certain embodiments, the head entity-tail entity pair may have more than one relation. When none of the values of the multiple relations for the head entity-tail entity pair equals to or is greater than 0.5, the head entity-tail entity is defined as having no relation. In certain embodiments, the multiple relations may include one relation as "no relation," which is given when the head entity-tail entity pair has no relations. In certain embodiments, the relation prediction is performed using the equation (1). Kindly note that the relation prediction module 224 does not have to provide the prediction relation to the sentence-relation combination module 226 during training, but needs to provide the prediction relation to the sentence-relation combination module 226 during prediction.

At procedure 410, when the output sequence is available, the sentence-relation combination module 226 extracts sentences from the output sequence. Specifically, the context includes multiple sentences, and each word in the sentences is represented by one or a few vectors in the output sequence. For each sentence in the output sequence, the word vectors corresponding to the words in the sentence are averaged to obtain one vector, which is named the sentence vector. As a result, the extracted sentences include multiple sentence vectors, each sentence vector represent one sentence in the document.

At procedure 412, the sentence-relation combination module 226 provides relation vectors, combines the extracted sentences with one of the relation vectors, and sends the combination to the evidence prediction module 230. The relation vectors correspond to all the relations to be analyzed in the model, and the one of the relation vectors used in the combination corresponds to the labeled relation for the head entity-tail entity pair in step 408. In certain embodiments, the sentence-relation combination is performed using the equation (3). Kindly note the sentence-relation combination module 226 obtains the relation between entities from the training sample, i.e., from the true relation label during training. The number of the relation vectors can be 97 for DocRED. At the beginning of the training process, the values of the relation vectors can be randomly generated, and in the following training process the values of the relation vectors are updated. In certain embodiments, the values of the relation vectors can also be stored in the training data 240. The sentence-relation combination module 226 performs the combination of the sentence vectors and the relation vector corresponding to the true relation using the second bilinear layer 126.

At procedure 414, after performance of the language model 222, the attention extraction module 228 extracts attention probabilities from the last l layers of the language model 222, and provides the attention probabilities to the evidence prediction module 230. In certain embodiments, the value of l depends on the complexity of the language model 222 and the complexity of the training data. In certain embodiments, when the language model 222 is BERT base model, l is in a range of 2-5. In one embodiment, l is 3.

At procedure 416, upon receiving the combination of the sentence extraction and the relation vector from the sentence-relation combination module 226, and the attention probabilities from the attention extraction module 228, the evidence prediction module 230 predicts the evidence sentences supporting the relation using the third bilinear layer 130. In certain embodiments, the evidence prediction is performed using the equation (9).

At procedure 418, when the relation prediction and the evidence prediction is completed, the updating module 232 calculates the loss function using the predictions and the training data labels, and updating the parameters of the model based on the loss function. In certain embodiments, the loss function is calculated using the equation (10).

At procedure 420, after updating the model parameters, the training processes 402-418 may be performed again using the same training sample to optimize the model parameters. The iterations of training using the same sample may be finished after a predetermined number of iterations, or until the model parameters are converged. After training using one training sample, the above training procedures 402-420 are repeated using another training sample. When the parameters of the model converges after training using a set of samples, the model is fine-tuned and is ready for prediction. In certain embodiments, the training process may also stop when a predetermined round of training process is performed.

Figure 5:
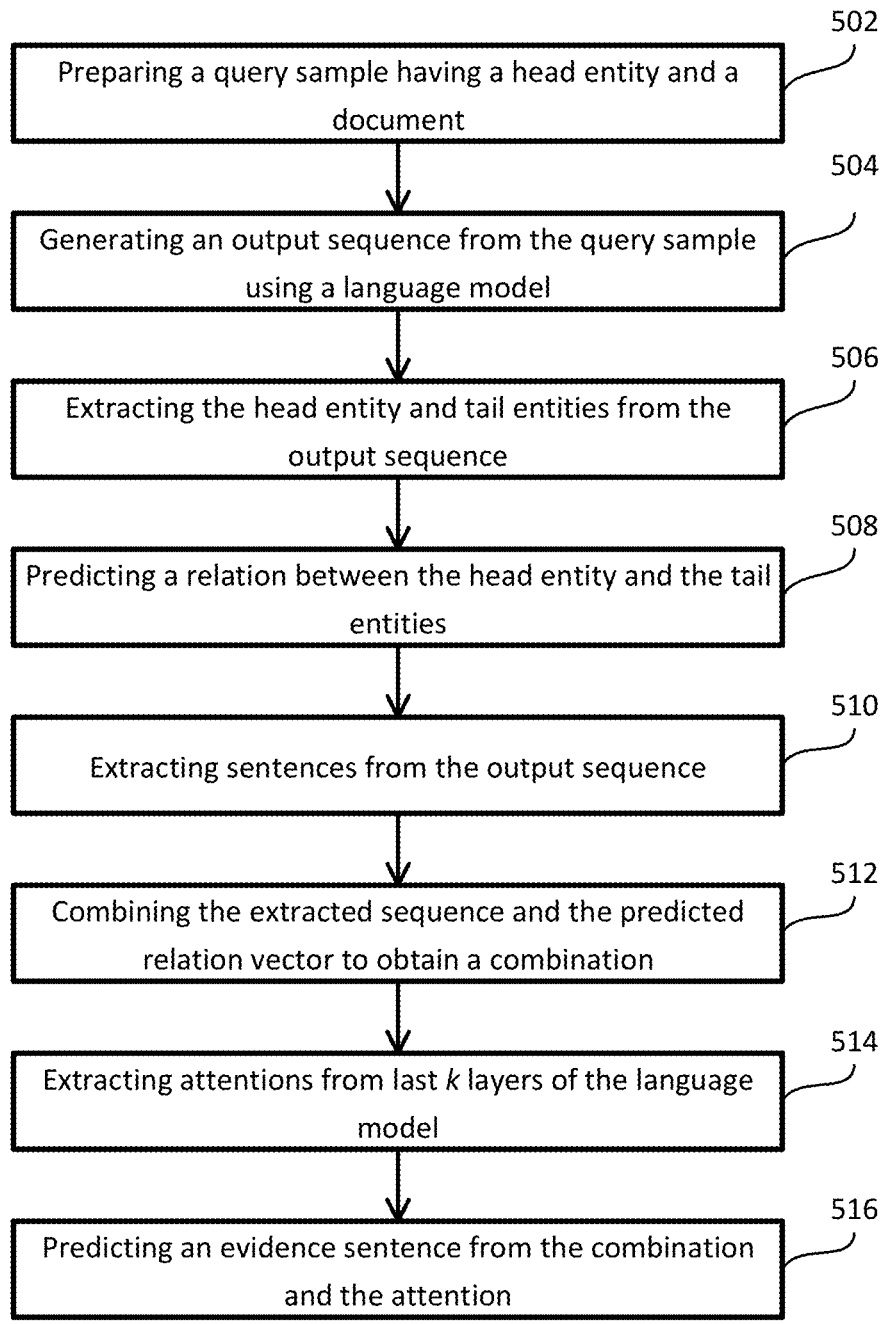
FIG. 5 schematically depicts a process for relation prediction according to certain embodiments of the present disclosure.

FIG. 5 schematically depicts a method for relation prediction and evidence prediction according to certain embodiments of the present disclosure. In certain embodiments, the predicting process is implemented by the server computing device shown in FIG. 2. It should be particularly noted that, unless otherwise stated in the present disclosure, the steps of the training process or method may be arranged in a different sequential order, and are thus not limited to the sequential order as shown in FIG. 5.

As shown in FIG. 5, the method 500 includes procedures 502-516, which is basically the same as the procedures 402-416. However, the query sample includes the head entity and the context, but does not include labels of tail entities, labels of relations, and labels of evidence sentences. Further, in the procedure 412, the combination of the extracted sequence and the relation vector uses the true labeled relation from the training sample corresponding to the head entity-tail entity pair analyzed in the procedure 408, while in the procedure 512, the combination uses the relation vector corresponding to the predicted relation at the procedure 508.

In certain embodiments, when a user only needs relation prediction but does not need the evidence prediction, the model can also be used to only operate the relation prediction part, which makes the prediction faster. Although the evidence prediction, which includes the steps 510-516, is not required, the well-trained model still considers the contribution of evidence prediction though the language model parameters. Specifically, the relation prediction still considers the sentences that it should put more weight on, and the relation prediction is thus more accurate than not considering the evidence prediction.

In certain embodiments, instead of defining head entity and the context for the sample, the model may also define head entity, tail entity/entities, and the context for the sample. However, this cost more computing resources, and therefore, the head entity and context formatted training sample and query sample are preferred than the head entity, tail entity and context formatted samples.

In certain aspects, the present disclosure relates to a non-transitory computer readable medium storing computer executable code. In certain embodiments, the computer executable code may be the software stored in the storage device 216 as described above. The computer executable code, when being executed, may perform one of the methods described above.

Experiments are performed which prove the advantages of the embodiments of the present disclosure. The data set used in the experiments is DocRED. DocRED is a large document level data set for the tasks of relation extraction and evidence sentence prediction. It consists of 5053 documents, 132375 entities, and 56354 relations mined from Wikipedia articles. For each (head, tail) entity pair, there are 97 different relation types as the candidates to predict, where the first relation type is an "NA" relation between two entities (i.e., no relation), and the rest corresponding to a WikiData relation name. Each of the head/tail pairs that contain valid relations also include a set of supporting evidence sentences. We follow the same setting in (Yao et al., 2019) to split the data into Train/Validation/Test for model evaluation to make a fair comparison. The number of documents in Train/Validation/Test is 3000/1000/1000, respectively.

The dataset is evaluated with the metrics of relation extraction RE F1, and evidence Evi F1. There are also instances where relational facts may occur in the validation and train set, and so we also evaluate on the Ign RE F1, which removes these relational facts.

The experimental setup is as follows. First is hype-parameter setting. The configuration for the BERT-base model follows the setting in (Devlin et al., 2019). We set the learning rate as $1e^{-5}$, $\lambda_1$ as $1e^{-4}$, the hidden dimension of the relation vectors as 108, and extract internal attention probabilities from last three BERT layers.

We conduct most of our experiments by fine-tuning the BERT-base model. The implementation is based on the PyTorch (Paszke et al., 2017) implementation of BERT. We run our model on a single V100 GPU for 60 epochs, resulting in approximately one day of training. The DocRED baseline and our E2GRE model have 115M parameters.

We compare our model with the following four published baseline models.

1. Context Aware BiLSTM. Yao et al., 2019 introduced the original baseline to DocRED in their paper. They used a context-aware BiLSTM (+additional features such as entity type, coreference and distance) to encode the document. Head and tail entities are then extracted for relation extraction.

2. BERT Two-Step. Wang et al., (2019) introduced fine-tuning BERT in a two-step process, where the model first predicts the NA relation, and then predicts the rest of the relations.

3. HIN. Tang et al., (2020) introduced using a hierarchical inference network to help aggregate the information from entity to sentence and further to document-level in order to obtain semantic reasoning over an entire document.

4. BERT+LSR. Nan et al., (2020) introduced using an induced latent graph structure to help learning how the information should flow between entities and sentences within a document.

As shown in FIG. 6, Table 1, our method E2GRE is the current state-of-art model on the public leaderboard for DocRED.

FIG. 7, Table 2 compares our method with the baseline models. From Table 2, we observe that our E2GRE method is not only competitive to the previous best methods on the development set, but also holds the following advantages over previous models: (1) Our method is more intuitive and simpler in design compared to the HIN model and BERT+LSR model. In addition, our method provides interpretable relation extraction with supporting evidence prediction. (2) Our method is also better than all other models on the Ign RE F1 metric. This shows that our model does not memorize relational facts between entities, but rather examine relevant areas in the document to generate the correct relation extraction.

Compared to the original BERT baseline, our training time is slightly longer, due to the multiple new entity-guided input sequences. We examined with the idea of generating new sequences based on each head and tail entity pair, but such a method would scale quadratically with the number of entities in the document. Using our entity-guided approach strikes a balance between performance and the training time.

We further conducted ablation study. FIG. 8, Table 3 shows the ablation study of our method on the effectiveness of entity-guided and evidence-guided training. The baseline here is the joint training model of relation extraction and evidence prediction with BERT-base. We see that the entity-guided BERT improves the over this baseline by 2.5%, and evidence guided training further improve the method by 1.7%. This shows that both parts of our method are important to the overall E2GRE method. Our E2GRE method not only obtains improvement on the relation extraction F1, but it also obtains significant improvement on evidence prediction compared to this baseline. This further shows that our evidence-guided fine-tuning method is effective, and the joint training with evidence guidance helps more on relation extraction.

We also conducted experiments to analyze the impact of the number of BERT layers used for obtaining attention probability values. As shown in FIG. 9, Table 4, we observe that using more layers is not necessarily better for relation extraction. One possible reason may be that the BERT model encodes more syntactic information in the middle layers (Clark et al., 2019).

FIG. 3 shows an example from the validation set of our model. In that example, the relation between "The Legend of Zelda" and "Link" relies on information across multiple sentences in the given document.

Figure 10:
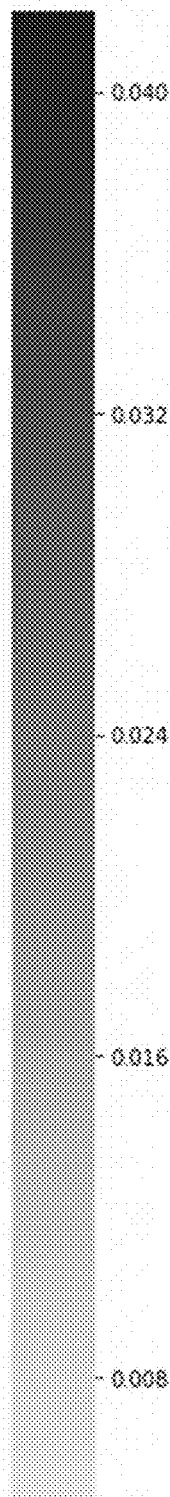
FIG. 10 shows a baseline BERT attention heatmap over the tokenized document of a DocRED example.

FIG. 10 shows the attention heatmap of naively applying BERT for relation extraction. This heatmap shows the attention of each word receives from 'The Legend of Zelda" and "Link". We observed that the model is able to locate the relevant areas of "Link" and "Legend of Zelda series", but the attention values over the rest of the document are very small. Therefore, the model has trouble in extracting out information within the document to generate a correct relation prediction.

Figure 11:
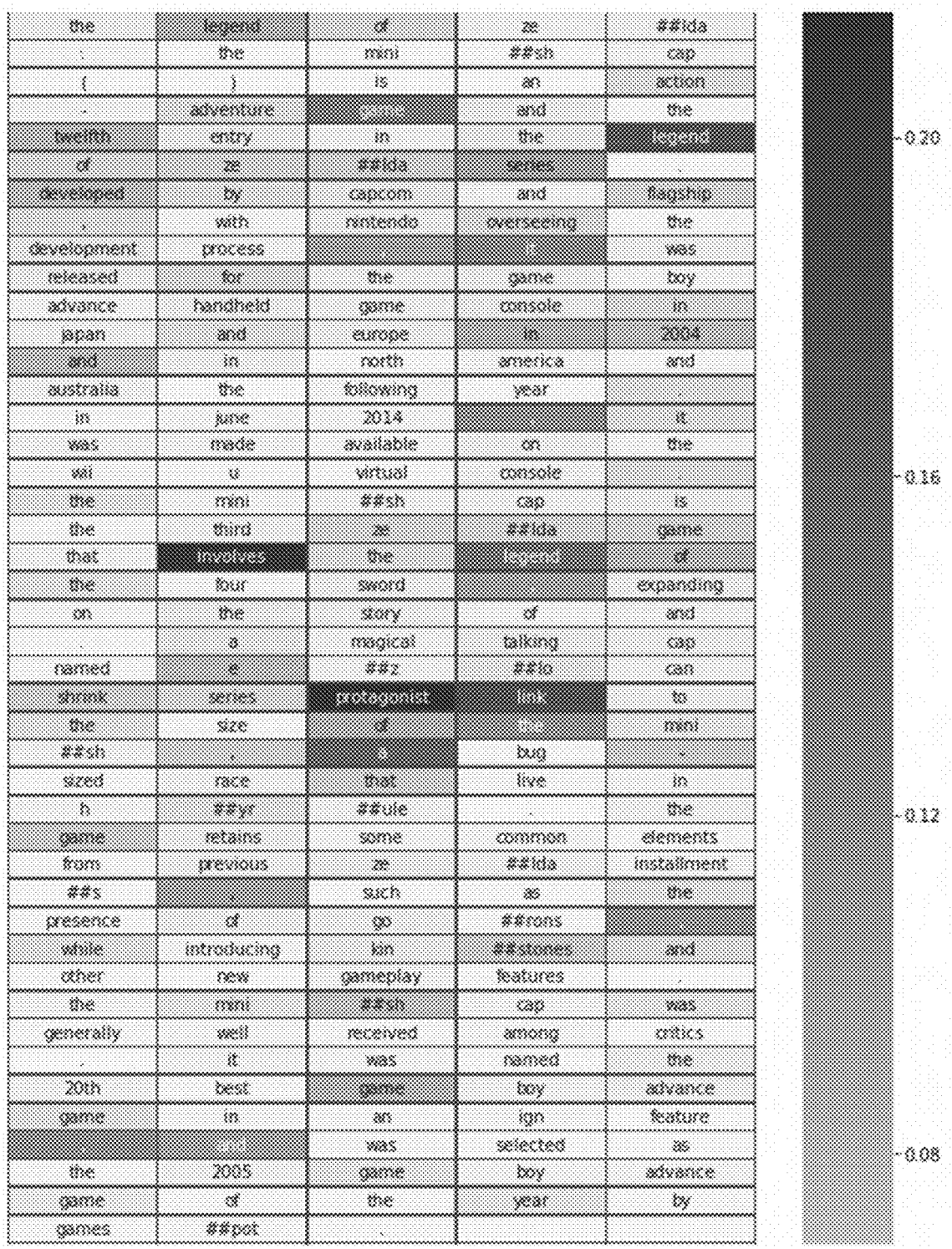
FIG. 11 shows E2GRE's attention heatmap over the tokenized document of a DocRED example.

In contrast, FIG. 11 shows that our E2GRE model highlights the evidence sentences, particularly in the areas where it finds relevant information. Phrases related to "Link" and "The Legend of Zelda series" are assigned with the higher weights. Words (such as "protagonist" or "involves") linking these phrases together are also highly weighted. Moreover, the scale of the attention probabilities for E2GRE is also much larger than that of the baseline. All of these phrases and bridging words are located within the evidence sentences, and make our model better at evidence prediction as well.

In conclusion, in order to more effectively exploit pre-trained LMs for document-level RE, we provide a new entity and evidence guided relation extraction (E2GRE) approach. We first generate new entity guided sequences to feed into an LM, focusing the model on the relevant areas in the document. Then we utilize the internal attentions extracted from the last 1 layers to help guide an LM to focus on relevant areas of the document. Our E2GRE method improves performance on both RE and evidence prediction on DocRED dataset, and achieves the state-of-the-art performance on the DocRED public leaderboard.

In certain embodiments, we also incorporate our ideas on using attention-guided multitask learning to other NLP tasks with evidence sentences. In certain embodiments, we combines our approach with graph-based models for NLP tasks. In certain embodiments, we also combine our approach with graph neural networks.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES (INCORPORATED HEREIN BY REFERENCE IN THEIR ENTIRETY)

1. Christoph Alt, Marc Hubner, and Leonhard Hennig, Improving relation extraction by pre-trained language representations, 2019, arXiv:1906.03088.
2. Livio Baldini Soares, Nicholas FitzGerald, Jeffrey Ling, and Tom Kwiatkowski, Matching the blanks: Distributional similarity for relation learning, Proceedings of the 57th Annual Meeting of the Association for Computational Linguistics, 2019, 2895-2905.
3. Razvan Bunescu and Raymond Mooney, A shortest path dependency kernel for relation extraction, Proceedings of Human Language Technology Conference and Conference on Empirical Methods in Natural Language Processing, 2005, 724-731.

4. Rui Cai, Xiaodong Zhang, and Houfeng Wang, Bidirectional recurrent convolutional neural network for relation classification, Proceedings of the 54th Annual Meeting of the Association for Computational Linguistics, 2016, 1:756-765.
5. Fenia Christopoulou, Makoto Miwa, and Sophia Ananiadou, Connecting the dots: Document-level neural relation extraction with edge-oriented graphs, Proceedings of the 2019 Conference on Empirical Methods in Natural Language Processing and the 9th International Joint Conference on Natural Language Processing (EMNLP-IJCNLP), 2019, 4924-4935.
6. Kevin Clark, Urvashi Khandelwal, Omer Levy, and Christopher D. Manning, What does BERT look at? an analysis of BERT's attention, 2019, ArXiv,abs/1906.04341.
7. Jacob Devlin, Ming-Wei Chang, Kenton Lee, and Kristina Toutanova, BERT: Pre-training of deep bidirectional transformers for language understanding, Proceedings of the 2019 Conference of the North American Chapter of the Association for Computational Linguistics: Human Language Technologies, 2019a, 1:4171-4186.
8. Markus Eberts and Adrian Ulges, Span-based joint entity and relation extraction with transformer pre-training, 2019, arXiv:1909.07755.
9. Zhijiang Guo, Yan Zhang, and Wei Lu, Attention guided graph convolutional networks for relation extraction, Proceedings of the 57th Annual Meeting of the Association for Computational Linguistics, 2019, 241-251.
10. Xu Han, Pengfei Yu, Zhiyuan Liu, Maosong Sun, and Peng Li, Hierarchical relation extraction with coarse-to-fine grained attention, Proceedings of the 2018 Conference on Empirical Methods in Natural Language Processing, 2018, 2236-2245.
11. Iris Hendrickx, Su Nam Kim, Zornitsa Kozareva, Preslav Nakov, Diarmuid O Seaghdha, Sebastian Pado, Marco Pennacchiotti, Lorenza Romano, and Stan Szpakowicz, SemEval-2010 task 8: Multi-way classification of semantic relations between pairs of nominals, Proceedings of the 5th International Workshop on Semantic Evaluation, 2010, 33-38.
12. Robin Jia, Cliff Wong, and Hoifung Poon, Document-level n-ary relation extraction with multiscale representation learning, Proceedings of the 2019 Conference of the North American Chapter of the Association for Computational Linguistics: Human Language Technologies, 2019, 1:3693-3704.
13. Mandar Joshi, Danqi Chen, Yinhan Liu, Daniel S. Weld, Luke Zettlemoyer, and Omer Levy, Spanbert: Improving pre-training by representing and predicting spans, 2019, arXiv:1907.10529.
14. Jiao Li, Yueping Sun, Robin J. Johnson, Daniela Sciaky, Chih-Hsuan Wei, Robert Leaman, Allan Peter Davis, Carolyn J. Mattingly, Thomas C. Wiegers, and Zhiyong Lu, BioCreative V CDR task corpus: a resource for chemical disease relation extraction, Database, 2016, doi: 10.1093/database/baw068.
15. Guoshun Nan, Zhijiang Guo, Ivan Sekulic, and Wei Lu, Reasoning with latent structure refinement for document-level relation extraction, 2020, arXiv:2005.06312.
16. Yinhan Liu, Myle Ott, Naman Goyal, Jingfei Du, Mandar Joshi, Danqi Chen, Omer Levy, Mike Lewis, Luke Zettlemoyer, RoBERTa: A robustly optimized BERT pre-training approach, 2019, arXiv:1907.11692.
17. Adam Paszke, Sam Gross, Soumith Chintala, Gregory Chanan, Edward Yang, Zachary DeVito, Zeming Lin, Alban Desmaison, Luca Antiga, and Adam Lerer, Automatic differentiation in pytorch, 31st Conference on Neural Information Processing Systems (NIPS 2017), 2017.
18. Nanyun Peng, Hoifung Poon, Chris Quirk, Kristina Toutanova, and Wen tau Yih, Cross-sentence N-ary relation extraction with graph LSTMs, Transactions of the Association for Computational Linguistics, 2017, 5:101-116.
19. Chris Quirk and Hoifung Poon, Distant supervision for relation extraction beyond the sentence boundary, Proceedings of the 15th Conference of the European Chapter of the Association for Computational Linguistics, 2017, 1:1171-1182.
20. Alec Radford, Jeff Wu, Rewon Child, David Luan, Dario Amodei, and Ilya Sutskever, Language models are unsupervised multitask learners, 2019.
21. Linfeng Song, Yue Zhang, Zhiguo Wang, and Daniel Gildea, N-ary relation extraction using graphstate LSTM, Proceedings of the 2018 Conference on Empirical Methods in Natural Language Processing, 2018, 2226-2235.
22. Hengzhu Tang, Yanan Cao, Zhenyu Zhang, Jiangxia Cao, Fang Fang, Shi Wang, and Pengfei Yin, HIN: hierarchical inference network for document-level relation extraction, 2020, arXiv:2003.12754.
23. Bayu Distiawan Trisedya, Gerhard Weikum, Jianzhong Qi, and Rui Zhang, Neural relation extraction for knowledge base enrichment, Proceedings of the 57th Annual Meeting of the Association for Computational Linguistics, 2019, 229-240.
24. Ashish Vaswani, Noam Shazeer, Niki Parmar, Jakob Uszkoreit, Llion Jones, Aidan N. Gomez, Lukasz Kaiser, and Illia Polosukhin, Attention is all you need, Proceedings of the 31st International Conference on Neural Information Processing Systems, 2017, 6000-6010.
25. David Wadden, Ulme Wennberg, Yi Luan, and Hannaneh Hajishirzi, Entity, relation, and event extraction with contextualized span representations, Proceedings of the 2019 Conference on Empirical Methods in Natural Language Processing and the 9th International Joint Conference on Natural Language Processing (EMNLP-IJCNLP), 2019, 5783-5788.
26. Hong Wang, Christfried Focke, Rob Sylvester, Nilesh Mishra, and William Wang, Fine-tune BERT for DocRED with two-step process, 2019, arXiv:1909.11898.
27. Linlin Wang, Zhu Cao, Gerard de Melo, and Zhiyuan Liu, Relation classification via multi-level attention CNNs, Proceedings of the 54th Annual Meeting of the Association for Computational Linguistics, 2016, 1:1298-1307.
28. Zhilin Yang, Zihang Dai, Yiming Yang, Jaime Carbonell, Russ R Salakhutdinov, and Quoc V Le, XLNET: Generalized autoregressive pretraining for language understanding, Advances in Neural Information Processing Systems 32 (NIPS 2019), 2019, 5754-5764.
29. Yuan Yao, Deming Ye, Peng Li, Xu Han, Yankai Lin, Zhenghao Liu, Zhiyuan Liu, Lixin Huang, Jie Zhou, and Maosong Sun, DocRED: A large-scale document-level relation extraction dataset, Proceedings of the 57th Annual Meeting of the Association for Computational Linguistics, 2019, 764-777.
30. Tom Young, Erik Cambria, Iti Chaturvedi, Hao Zhou, Subham Biswas and Minlie Huang, Augmenting end-to-end dialog systems with commonsense knowledge, thirty-Second AAAI Conference on Artificial Intelligence, 2018, 4970-4977.
31. Mo Yu, Wenpeng Yin, Kazi Saidul Hasan, Cicero dos Santos, Bing Xiang, and Bowen Zhou, Improved neural relation detection for knowledge base question answering, Proceedings of the 55th Annual Meeting of the Association for Computational Linguistics, 2017, 1:571-581.
32. Dmitry Zelenko, Chinatsu Aone, and Anthony Richardella, Kernel methods for relation extraction, Journal of Machine Learning Research, 2003, 3:1083-1106.
33. Daojian Zeng, Kang Liu, Siwei Lai, Guangyou Zhou, and Jun Zhao, Relation classification via convolutional deep neural network, Proceedings of COLING 2014, the 25th International Conference on Computational Linguistics: Technical Papers, 2014, 2335-2344.
34. Yuhao Zhang, Victor Zhong, Danqi Chen, Gabor Angeli, and Christopher D. Manning, Position-aware attention and supervised data improve slot filling, Proceedings of the 2017 Conference on Empirical Methods in Natural Language Processing (EMNLP 2017), 2017, 35-45.
35. Yi Zhao, Huaiyu Wan, Jianwei Gao, and Youfang Lin, Improving relation classification by entity pair graph, Proceedings of The Eleventh Asian Conference on Machine Learning, Proceedings of Machine Learning Research, 2019, 101:1156-1171.

What is claimed is:

1. A system comprising a computing device, the computing device comprising a processer and a storage device storing computer executable code, wherein the computer executable code, when executed at the processor, is configured to:
provide a head entity and a document containing the head entity;
process the head entity and the document by a language model to obtain head extraction corresponding to the head entity, tail extractions corresponding to tail entities in the document, and sentence extraction corresponding to sentences in the document;
predict a head entity-tail entity relation between the head extraction and the tail extractions using a first bilinear layer, wherein a probability of the head entity-tail entity relation is predicted using the first bilinear layer with sigmoid activation function;
combine the sentence extraction and a relation vector corresponding to the head extraction and the tail extraction using a second bilinear layer to obtain a sentence-relation combination, wherein a probability of one of the sentences being an evidence sentence with regard to the head entity-tail entity relation is predicted using the second bilinear layer with sigmoid activation function;
predict an evidence sentence from the document using a third bilinear layer based on the sentence-relation combination and attention extracted from the language model, wherein the evidence sentence supports the head-tail relation, and attention probabilities corresponding to each pair of the head entity and one of the tail entities are combined with the sentence-relation combination and fed into the third bilinear layer with sigmoid activation function; and
update parameters of the language model and the first, second and third bilinear layers based on the predicted head entity-tail entity relation, the predicted evidence sentence, and labels of the document containing true head entity-tail entity relation and true evidence sentence,
wherein the computer executable code is configured to update the parameters based on a loss function, the loss function is defined by Loss=$L_{RE}+\lambda_1 * L_{Evi}^{\alpha}$, $L_{RE}$ is relation prediction loss, $L_{Evi}^{\alpha}$ is sentence prediction loss, $\lambda_1$ is a weight factor having a value equals to or greater than 0.

2. The system of claim 1, wherein the language model and the first, second and third bilinear layers are trained using a plurality of labeled documents, at least one of the labeled documents has E number of entities, the at least one of the labeled documents is expanded to E number of samples, each of the E number of samples comprises the at least one of the labeled documents and a head entity corresponding to one of the E number of entities, and E is a positive integer.

3. The system of claim 1, wherein the language model comprises at least one of generative pre-training model (GPT), GPT-2, bidirectional encoder representations from transformers (BERT), robustly optimized BERT approach (roBERTa), and reparameterized transformer-XL network (XLnet).

4. The system of claim 1, wherein the computer executable code is configured to extract the attention from last 2 to 5 layers of the language model.

5. The system of claim 4, wherein the computer executable code is configured to extract the attention from last 3 layers of the language model.

6. The system of claim 1, wherein the first bilinear layer is defined by $\hat{y}_{ik}=\delta(h^T W_i t_k + b_i)$, $\hat{y}_{ik}$ is a predicted value of an i-th of a plurality of relations between head entity h and a j-th tail entity $t_k$, $\delta$ represents a sigmoid function, $W_i$ is learned weights of the first bilinear layer, and $b_i$ is a bias of the first bilinear layer.

7. The system of claim 6, wherein the second bilinear layer is defined by $\hat{y}_{jk}^i=\delta(f_{jk}^i W_o^r + b_o^r)$, $f_{jk}^i=s_j W_i^r r_i + b_i^r$, $\hat{y}_{jk}^i$ is a predicted possibility of a j-th sentence $s_j$ in the document being a supporting sentence with regard to an i-th relations $r_i$, $W_i^r/b_i^r$ and $W_o^r/b_o^r$ are learnable parameters of the second bilinear layer in regard to the i-th relation.

8. The system of claim 7, wherein the third bilinear layer is defined by $\hat{y}_k^{i\alpha}=\delta(\alpha_{sk} W_i^{\alpha} f_k^i + b_i^{\alpha})$, $\hat{y}_k^{i\alpha}$ is predicted probability of the j-th sentence in the document being a support sentence to the i-th relation with regard to the k-th tail entity, $\delta$ represents a sigmoid function, $W_i^{\alpha}$ is learned weights of the third bilinear layer, and $b_i^{\alpha}$ is a bias of the third bilinear layer.

9. The system of claim 1, wherein after training, the language model and the first, second and third bilinear layers are configured to provide relation prediction and evidence prediction for a query entry having a query head entity and a query document containing the query head entity.

10. The system of claim 1, wherein the computer executable code is further configured to provide tail entities of the document.

11. A method comprising:
providing, by a computing device, a head entity and a document containing the head entity;
processing, by a language model stored in the computing device, the head entity and the document to obtain head extraction corresponding to the head entity, tail extraction corresponding to tail entities in the document, and sentence extraction corresponding to sentences in the document;
predicting, by a first bilinear layer stored in the computing device, a head-tail relation between the head extraction and the tail extraction, wherein a probability of t is predicted using the first bilinear layer with sigmoid activation function;
combining, by a second bilinear layer stored in the computing device, the sentence extraction and a relation vector corresponding to the head extraction and the tail extraction, to obtain a sentence-relation combination, wherein a probability of one of the sentences being an evidence sentence is predicted with regard to the head entity-tail entity relation using the second bilinear layer with sigmoid activation function;

predicting, by a third bilinear layer stored in the computing device, an evidence sentence from the document based on the sentence-relation combination and attention extracted from the language model, wherein the evidence sentence supports the head tail relation, and attention probabilities corresponding to each pair of the head entity and one of the tail entities are combined with the sentence-relation combination and fed into the third bilinear layer with sigmoid activation function; and updating parameters of the language model and the first, second and third bilinear layers based on the predicted head entity-tail entity relation, the predicted evidence sentence, and labels of the document containing true head entity-tail entity relation and true evidence sentence, wherein the step of updating the parameters is performed based on a loss function, the loss function is defined by Loss=$L_{RE}+\lambda_1 * L_{Evi}^\alpha$, $L_{RE}$ is relation prediction loss, $L_{Evi}^\alpha$ is sentence prediction loss, $\lambda_1$ is a weight factor having a value equals to or greater than 0.

12. The method of claim 11, wherein the language model comprises at least one of generative pre-training model (GPT), GPT-2, bidirectional encoder representations from transformers (BERT), robustly optimized BERT approach (roBERTa), and reparameterized transformer-XL network (XLnet).

13. The method of claim 11, the attention is extracted from the last 3 layers of the language model.

14. The method of claim 11,
wherein the first bilinear layer is defined by $\hat{y}_{ik}=\delta(h^T W_i t_k + b_i)$, $\hat{y}_{ik}$ is a predicted value of an i-th of a plurality of relations between head entity h and a j-th tail entity $t_k$, $\delta$ represents a sigmoid function, $W_i$ is learned weights of the first bilinear layer, and $b_i$ is a bias of the first bilinear layer;
wherein the second bilinear layer is defined by $\hat{y}_{jk}^i = \delta(f_{jk}^i W_o^r + b_o^r)$, $f_{jk}^i = s_j W_i^r r_i + b_i^r$, $\hat{y}_{jk}^i$ is a predicted possibility of a j-th sentence $s_j$ in the document being a supporting sentence with regard to an i-th relations $r_i$, $W_i^r/b_i^r$ and $W_o^r/b_o^r$ are learnable parameters of the second bilinear layer in regard to the i-th relation; and
wherein the third bilinear layer is defined by $\hat{y}_k^{i\alpha} = (\alpha_{sk} W_i^\alpha f_k^i + b_i^\alpha)$, $\hat{y}_k^{i\alpha}$ is predicted probability of the j-th sentence in the document being a support sentence to the i-th relation with regard to the k-th tail entity, $\delta$ represents a sigmoid function, $W_i^\alpha$ is learned weights of the third bilinear layer, and $b_i^\alpha$ is a bias of the third bilinear layer.

15. The method of claim 11, further comprising, after well training: providing relation prediction and an evidence prediction for a query entry, wherein the query entry has a query head entity and a query document containing the query head entity.

16. A non-transitory computer readable medium storing computer executable code, wherein the computer executable code, when executed at a processor of an active computing device, is configured to:

provide a head entity and a document containing the head entity;

process the head entity and the document by a language model to obtain head extraction corresponding to the head entity, tail extractions corresponding to tail entities in the document, and sentence extraction corresponding to sentences in the document;

predict a head entity-tail entity relation between the head extraction and the tail extractions using a first bilinear layer, wherein a probability of the head entity-tail entity relation is predicted using the first bilinear layer with sigmoid activation function;

combine the sentence extraction and a relation vector corresponding to the head extraction and the tail extraction using a second bilinear layer to obtain a sentence-relation combination, wherein a probability of one of the sentences being an evidence sentence with regard to the head entity-tail entity relation is predicted using the second bilinear layer with sigmoid activation function;

predict an evidence sentence from the document using a third bilinear layer based on the sentence-relation combination and attention extracted from the language model, wherein the evidence sentence supports the head-tail relation, and attention probabilities corresponding to each pair of the head entity and one of the tail entities are combined with the sentence-relation combination and fed into the third bilinear layer with sigmoid activation function; and update parameters of the language model and the first, second and third bilinear layers based on the predicted head entity-tail entity relation, the predicted evidence sentence, and labels of the document containing true head entity-tail entity relation and true evidence sentence, wherein the computer executable code is configured to update the parameters based on a loss function, the loss function is defined by Loss=$L_{RE}+\lambda_1 * L_{Evi}^\alpha$, $L_{RE}$ is relation prediction loss, $L_{Evi}^\alpha$ is sentence prediction loss, $\lambda_1$ is a weight factor having a value equals to or greater than 0.

17. The non-transitory computer readable medium of claim 16,
wherein the first bilinear layer is defined by $\hat{y}_{ik}=\delta(h^T W_i t_k + b_i)$, $\hat{y}_{ik}$ is a predicted value of an i-th of a plurality of relations between head entity h and a j-th tail entity $t_k$, $\delta$ represents a sigmoid function, $W_i$ is learned weights of the first bilinear layer, and $b_i$ is a bias of the first bilinear layer;
wherein the second bilinear layer is defined by $\hat{y}_{jk}^i = \delta(f_{jk}^i W_o^r + b_o^r)$, $f_{jk}^i = s_j W_i^r r_i + b_i^r$, $\hat{y}_{jk}^i$ is a predicted possibility of a j-th sentence $s_j$ in the document being a supporting sentence with regard to an i-th relations $r_i$, $W_i^r/b_i^r$ and $W_o^r/b_o^r$ are learnable parameters of the second bilinear layer in regard to the i-th relation; and
wherein the third bilinear layer is defined by $\hat{y}_k^{i\alpha} = \delta(\alpha_{sk} W_i^\alpha f_k^i + b_i^\alpha)$, $\hat{y}_k^{i\alpha}$ is predicted probability of the j-th sentence in the document being a support sentence to the i-th relation with regard to the k-th tail entity, $\delta$ represents a sigmoid function, $W_i^\alpha$ is learned weights of the third bilinear layer, and $b_i^\alpha$ is a bias of the third bilinear layer.

* * * * *